Oct. 13, 1936.                C. L. FORMONT                2,057,612
                NOZZLE AND MITER PIPE CUTTING MACHINE
                    Filed April 8, 1935        2 Sheets-Sheet 1
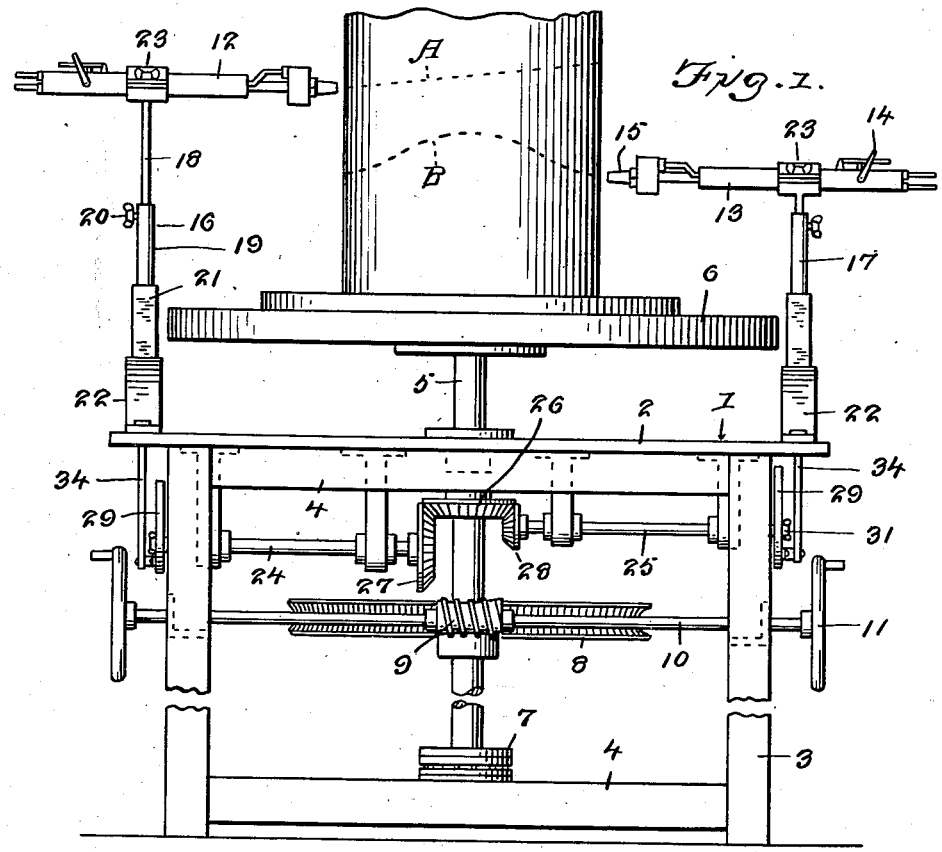
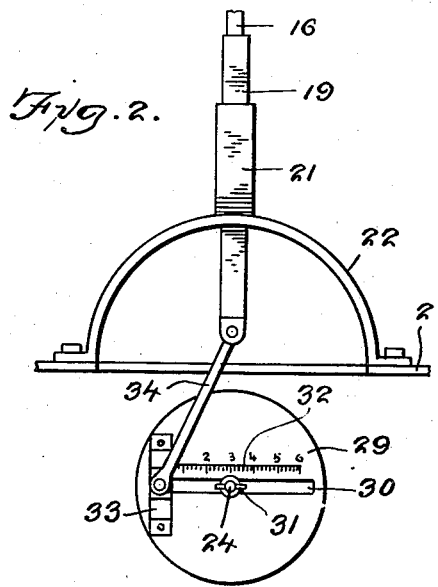
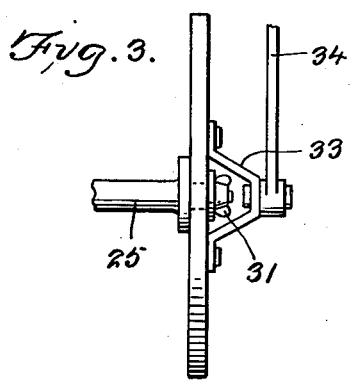
C. L. Formont
INVENTOR
BY Victor J. Evans & Co.
ATTORNEY Oct. 13, 1936.  C. L. FORMONT  2,057,612
NOZZLE AND MITER PIPE CUTTING MACHINE
Filed April 8, 1935    2 Sheets-Sheet 2
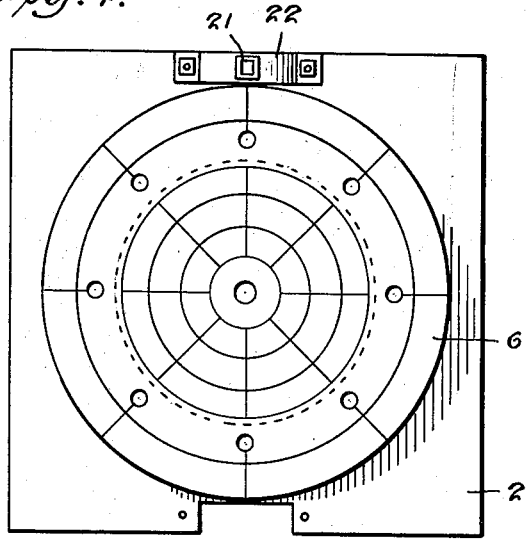
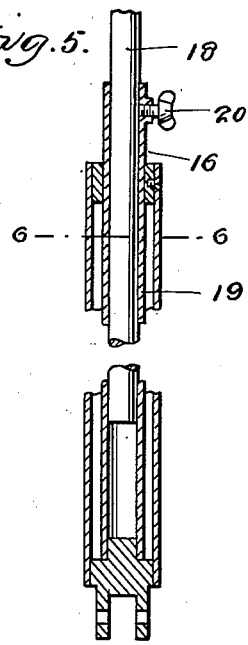
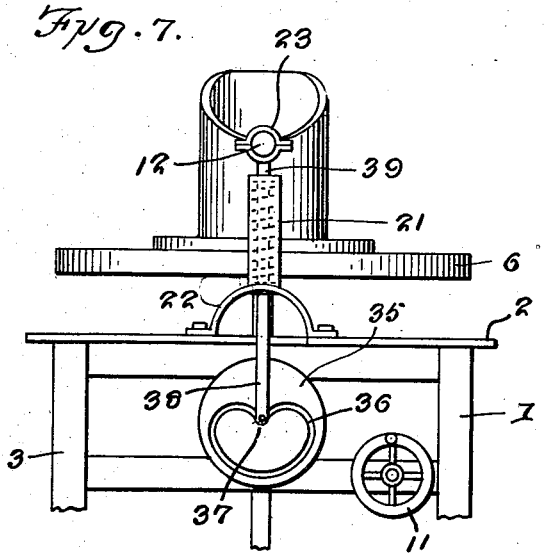
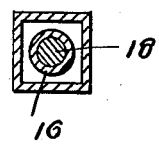
C. L. Formont
INVENTOR Patented Oct. 13, 1936

2,057,612

UNITED STATES PATENT OFFICE 2,057,612

NOZZLE AND MITER PIPE CUTTING MACHINE

Charles Louis Formont, Merchantville, N. J.

Application April 8, 1935, Serial No. 15,344

1 Claim. (Cl. 266—23)

This invention relates to a pipe cutting machine and has for the primary object the provision of a device of this character which is easy to operate and which is especially adapted for accurately cutting a welding end to a pipe which may be a nozzle or similar device to fit a wall of a second pipe about an opening formed therein so that said pipes when welded together will have a leakproof connection therebetween, with one pipe extending at a desired angle to the other pipe.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a pipe cutting machine constructed in accordance with my invention.

Figure 2 is a detail view showing the means of varying the stroke of the cutting apparatus.

Figure 3 is a fragmentary edge view illustrating the same.

Figure 4 is a plan view illustrating a table or work support of the machine.

Figure 5 is a fragmentary vertical sectional view illustrating an adjustable standard for the cutting apparatus.

Figure 6 is a sectional view taken on the line 6—6 of Figure 5.

Figure 7 is a fragmentary end elevation illustrating a modified form of my invention.

Referring in detail to the drawings, the numeral 1 indicates a supporting structure consisting of a horizontally arranged top 2 supported by legs 3 which are strengthened by braces 4. A vertically arranged shaft 5 is journaled to the supporting structure 1 and projects above the latter and has secured thereto a table or work rest 6. The lower end of the shaft 5 is supported by a thrust bearing 7 carried by the supporting structure 1.

A worm gear 8 is secured to the shaft 5 and meshes with a worm 9 secured to a drive shaft 10, the latter being journaled to the supporting structure 1 and equipped with hand wheels 11 whereby a person may impart rotation to the shaft 5. It is to be understood that the shaft 10 may be driven in some other manner than shown in the drawings. The work is positioned on the table or rest 6, as shown in Figure 1, and is cut by either of the oppositely arranged and horizontally disposed acetylene blow torches 12 and 13, each having a control 14 and a nozzle 15. The nozzle may be either of the straight or curved type depending on the type of cut desired to be made in the work.

It is to be understood that the work is in the form of a pipe and sometimes termed a nozzle for application by welding to a second pipe, the latter forming a part of a pipe-line for conveying liquid or air.

Adjustable standards 16 and 17 support the torches 12 and 13 in operative positions and each include telescopic sections 18 and 19 adjustable relative to one another and held in adjusted position by a set screw 20. The outer face of the section 19 is provided with annular faces matching annular faces of a bearing 21 whereby the section 19 may slide in the bearing but which will be held against rotation with respect to the bearing. The bearings 21 of the standards 16 and 17 are carried by arcuate-shaped brackets 22 bolted or otherwise secured to the top 2 of the supporting structure. The sections 18 of the standards 16 and 17 have separable clamps 23 to receive the torches 12 and 13 and which will permit said torches to be adjusted horizontally towards and from the work.

Shafts 24 and 25 are journaled to the supporting structure 1 and the shaft 5 has secured thereto a beveled gear 26. The shaft 24 is connected to the beveled gear 26 by a beveled gear 27 so that the shaft 24 will have a one to one ratio with respect to the shaft 5. The shaft 25 is connected to the gear 26 by a beveled gear 28 providing between the shafts 25 and 5 a gear ratio of one to two. Stroke varying plates or discs 29 are adjustably secured to the shafts 24 and 25 and are adapted to rotate with the latter. The discs 29 have slots 30 to receive the shafts 24 and 25 and the latter are screw threaded to receive wing nuts 31 whereby the discs may be adjusted with respect to said shafts 24 and 25. The discs are provided with scale plates 32 along the slots 30. Brackets 33 are eccentrically secured to the discs and have journaled thereto connecting rods 34 and the latter are in turn pivoted to the lower end of the sections 19 of the standards 16 and 17. The rotation of the discs by the shafts 24 and 25 imparts reciprocal motion to the standards 16 and 17, and by adjusting the discs on the shafts 24 and 25 the length of strokes of the standards may be varied.

The torch 12 is employed for making an angle cut in the work, as indicated by the line A, while the torch 13 is employed for making a cut in the work as indicated by the line B. The angle of the cut A may be varied by varying the stroke of the standard 16. Also the cut B in the work may be varied by varying the stroke of the standard 17. The cut B is accomplished by the torch 13 due to the fact that the shaft 25 rotates twice to the shaft 5 or, in other words, an up and down movement is completed by the torch 13 during one complete revolution of the work. The cut A is formed by the torch 12 making one stroke during one complete revolution of the work.

A pipe cut as indicated by B will have an end readily adaptable to a wall of a second pipe about an opening formed in the second pipe so that when said pipes are welded together a leakproof connection is established between said pipes. A pipe cut as indicated by A will have an end which will readily match a second pipe with the prepared or cut pipe extending angularly thereto so that when welded together a leakproof seal will be provided between the pipes.

To form a cut in work, as shown in Figure 7, a disc 35 is secured to the shaft 24 in lieu of the disc 29. The disc 35 has a cam groove 36 engaged by a pin or roller 37 of a connecting rod 38, the latter being connected to a standard 39 carrying the torch 12. The shape of the cam groove 36 during the rotation of the disc 35 and the rotation of the work at the same speed, will affect the cut, as shown in Figure 7.

To effect a straight cut of work, the connecting rod of the standard carries a torch disconnected from the drive means and locked in any suitable manner so that when the work is revolved relative to said torch, a straight cut will be formed therein.

Having described the invention, I claim:

A pipe cutting machine comprising a supporting structure including a horizontally disposed top, a vertical shaft journaled on the supporting structure and extending above the top and through the latter, a horizontal work rest secured to the upper end of the shaft and disposed over and spaced from the top, a vertically disposed standard adjustable as to length and mounted on said top, and located laterally of the work rest, a horizontally arranged cutter carried by said standard, means for rotating the shaft, a second shaft journaled on the supporting structure below the top and geared to said first shaft to rotate at an increased rate of speed over the speed of rotation of the first shaft, a disc having a slot receiving the second shaft whereby said disc may be adjusted laterally of the second shaft in opposite directions, a detachable securing means between the disc and second shaft, and drive means pivoted to the standard and eccentrically pivoted to said disc and at one end of the slot.

CHARLES LOUIS FORMONT.